United States Patent [19]

Hattrich et al.

[11] Patent Number: 4,514,539
[45] Date of Patent: Apr. 30, 1985

[54] STAIN RESISTANT POLYMERIC INSULATING COMPOSITIONS

[75] Inventors: George A. Hattrich; Stephen J. Byron, both of Hackettstown, N.J.

[73] Assignee: Reichhold Chemicals, Inc., White Plains, N.Y.

[21] Appl. No.: 491,734

[22] Filed: May 5, 1983

[51] Int. Cl.³ .......................... C08K 3/10; C08K 3/20; C08K 3/34; C08K 9/06

[52] U.S. Cl. ..................... 524/436; 174/110 SR; 174/110 PM; 174/120 SR; 264/174; 428/378; 428/379; 428/391; 524/437; 524/456; 524/524

[58] Field of Search ............... 524/437, 456, 436, 524; 260/DIG. 24; 174/120 SR, 110 SR; 428/379

[56] References Cited

U.S. PATENT DOCUMENTS

| | | | |
|---|---|---|---|
| 3,832,326 | 8/1974 | North et al. | 524/264 |
| 3,860,676 | 1/1975 | Krackeler et al. | 524/524 |
| 4,111,875 | 9/1978 | Uva | 524/513 |
| 4,116,914 | 9/1978 | Coran et al. | 525/222 |
| 4,150,193 | 4/1979 | Burns | 428/517 |
| 4,376,180 | 3/1983 | Turbett et al. | 524/188 |
| 4,381,362 | 4/1983 | Biggs et al. | 524/264 |
| 4,382,112 | 5/1983 | Betts et al. | 428/379 |

FOREIGN PATENT DOCUMENTS 0002830 7/1979 European Pat. Off. .
0054424 12/1981 European Pat. Off. .

OTHER PUBLICATIONS

"Martinal", Martinswerk, Sep. 1979, pp. 1-10.
"Irganox 1035", Ciba-Geigy, no publication date.
Vul-Cup Peroxide Hercules Bulletin, ORC-301F-three pages, no publication date.
"Irganox 1010", Ciba Geigy Technical Bulletin, no publication date.
Derwent, Abst. 22822, D/13, SU747865 (7-1980).
Derwent, Abst. 82692, A/46, J53115081 (10-1978).
Derwent, Abst. 82280, C/46, SU726133 (4-1980).

*Primary Examiner*—Herbert J. Lilling
*Attorney, Agent, or Firm*—Rodman and Rodman

[57] ABSTRACT

The present invention comprises a stain resistant flame retardant insulating composition that is stain resistant under conditions of natural aging, heat aging, or exposure to gases such as hydrogen sulfide or methane. The inventive insulating composition remains substantially white in color under elevated heating and combustion temperature conditions. The stain resistant electrical insulating composition of the present invention is also flame retardant and has a polymer system comprising ethylene-vinyl acetate copolymer and polyethylene. The composition also utilizes a vinyl silane component as a coupling agent, peroxide cross-linking agents, fillers, and a three part stabilizing system.

14 Claims, No Drawings

STAIN RESISTANT POLYMERIC INSULATING COMPOSITIONS

BACKGROUND OF THE INVENTION

This invention relates to cross-linkable polymeric compositions particularly suitable as insulating coatings for electric wires, cable, and other electrical conductors.

Polymeric insulating compositions should be flame retardant, and also moisture and heat resistant. Most electric insulating coatings have a tendency to undergo a change of color called "staining". Staining can occur over a period of time as a result of aging.

The prior art discloses several different cross-linkable polymeric compositions suitable as insulating coatings, however the problem of staining, and its solution have not yet been addressed satisfactorily.

U.S. Pat. No. 3,979,356 to Walters discloses a polymeric composition with dielectric properties suitable as an electrical insulator, which comprises an ethylene-vinyl acetate copolymer, hydrated alumina, and a silicone elastomer. The copolymer is cross-link cured to a thermoset state by means of a free radical forming organic peroxide.

U.S. Pat. No. 3,553,348 to Betts discloses an electrical insulating composition comprising a cross-linked ethylene copolymer having about 75 to 90% by weight of ethylene, a chlorine-containing polymer and a filler of magnesium silicate having a platelike structure coated with an alkoxy silane.

U.S. Pat. No. 3,832,326 to North et al discloses an electrical conductor composition comprising a cross-linkable ethylene-vinyl acetate polymer, one or more silanes, and one or more hydrated inorganic fillers.

SUMMARY OF THE INVENTION

The present invention comprises a stain resistant flame retardant insulating composition that is stain resistant under conditions of natural aging, heat aging, or exposure to gases such as hydrogen sulfide or methane. The inventive insulating composition remains substantially white in color under elevated heating and combustion temperature conditions.

DESCRIPTION OF THE PREFERRED EMBODIMENTS

The non-staining or stain resistant electrical insulating composition of the present invention is also flame retardant and has a unique polymer system. The combination of components provide stain resistant properties to the insulating composition under operating conditions. The composition includes a polymer or resin system and various additives. The components in the polymer are ethylene-vinyl acetate copolymer and polyethylene.

The inventive composition also includes a three-part stabilizing system which includes tetrakis [methylene 3-(3',5'-di-tert-butyl-4'-hydroxyphenyl) proprionate] methane (hereinafter referred to as "tetrakis methane"), thiodiethylene bis-(3,5-di-tert-butyl-4-hydroxy) hydrocinnamate (hereinafter referred to as "thiodiethylene hydrocinnamate"), and distearothiodipropionate (hereinafter referred to as "DSTDP").

The inventive composition also utilizes a vinyl silane component as a coupling agent, and peroxide cross-linking agents.

Fillers, such as aluminum trihydrate, hydrated magnesia, or hydrated calcium silicate can also be included.

The flame retardant, stain resistant insulating composition, is based upon 100 parts of the polymer or resin system. The remaining components are then measured in parts per 100 parts of resin (PHR). Thus, the proportions of components of the polymer or resin system portion of the insulating composition, can be referred to in terms of weight percent based upon 100 parts by weight of the polymeric or resin system in the insulation composition. The remaining components are then measured on a basis of parts per 100 parts of resin, or PHR.

The ethylene-vinyl acetate copolymer in the resin system can vary from 20 to 80 weight %, preferably from about 30 to 70 weight %. The ethylene-vinyl acetate copolymer can contain various levels of vinyl acetate. It is preferred that the ethylene-vinyl acetate copolymer contain about 25 to 35 weight % vinyl acetate, and preferably about 28 weight % vinyl acetate.

The polyethylene component of the resin can vary from about 20 to 80 weight %, preferably from about 30 to 70 weight % of the resin system.

It is particularly preferred that the resin system comprise 60 weight % ethylene-vinyl acetate copolymer and 40 weight % polyethylene. The polyethylene is preferably the low density homopolymer.

As has already been mentioned, the flame retardant composition also contains a filler, more specifically a hydrated inorganic filler, such as hydrated aluminum oxide, $Al_2O_3.3H_2O$ or $Al(OH)_3$, hydrated magnesia, or hydrated calcium silicate. Of these compounds, hydrated aluminum oxide is most preferred.

The function of reinforcing fillers in polymeric insulation compositions is well known. The main purpose of the reinforcing filler is to increase the physical strength properties of the composition, such as tensile strength and resistance to plastic flow at elevated temperatures. Also important is the fact that the filler enhances flame retardancy and the dilectric strength of the cured product. The amount of filler incorporated into the inventive composition can vary from about 80 to about 150 parts per 100 parts of resin (PHR), preferably 100 to 125 PHR.

The flame retardant composition also contains an antioxidant and thermal stabilizing system, which comprises tetrakis methane, thiodiethylene hydrocinnamate and DSTDP. All three components are used together to form the stabilizing system. The tetrakis methane can vary from about 0.5 to 4 PHR, and preferably about 1.5 PHR. Tetrakis methane is disclosed in more detail in U.S. Pat. Nos. 3,285,855 and 3,644,482. It is available from Ciba-Geigy as Irganox ® 1010.

Thiodiethylene hydrocinnamate can vary from about 0.5 to 3 PHR, preferably about 0.75 PHR. It is disclosed in more detail in U.S. Pat. Nos. 3,285,855 and 3,441,575, and is available from Ciba-Geigy under the name Irganox ® 1035.

DSTDP can vary from about 0.5 to 4 PHR, and preferably about 1.5 PHR. It is available under the name Cyanox ® from American Cyanamid.

The vinyl silane component in the present invention acts as a coupling agent to help bind the polymer to the inorganic filler. The preferred vinyl silanes are gamma-methacryloxy-propyltrimethoxy-silane and vinyl-tri (beta-methoxyethoxy) silane.

The vinyl silane components can vary from about 0.5 to 5 PHR, preferably about 1.75 PHR.

The cross linking of the polymer system is accomplished by incorporating a cross-linking agent, such as dicumyl peroxide, butylperoxydiisopropylbenzene peroxide, or t-butylcumyl peroxide, alone or in combination. Dicumyl peroxide and butylperoxydiisopropylbenzene peroxide are available from Hercules Inc. under the names Dicup ™ and Vul-cup ™, respectively. T-butylcumyl peroxide is available under the name Triganox T ™ from Noury Chemicals. The amount of peroxide cross-linking agent added to the polymer system can vary from about 1 to 10 PHR, preferably 5.75 PHR.

The composition of the present invention can be prepared in a variety of ways. For best results, it is important that the filler and silane component be intimately contacted. This can be accomplished by incorporating the silane with the polymer, followed by addition of the filler and the other components. An internal mixer, such as a Banbury, or Werner & Pfleiderer mixer can be used. Alternatively, the silane can be added directly to the filler, dispersed therein, followed by addition of the polymer.

The insulating composition of the present invention is applied to conducting material by extrusion to form what is commonly known as uniinsulation, an art accepted term denoting a single layer of insulation extruded around a conductor. This single layer functions as the insulation and the jacketing to provide physical protection and flame retardancy.

The compositions of the present invention are especially suitable for electrical service as uniinsulation in voltages varying up to about 2000 volts.

The following example denotes a specific composition within the scope of the invention.

EXAMPLE

| Component | Parts By Weight |
| --- | --- |
| Ethylene-vinyl acetate | 60 |
| Polyethylene | 40 |
| Hydrated alumina | 125 |
| Tetrakis methane | 1.5 |
| Thiodiethylene hydrocinnamate | 0.75 |
| Distearothiodipropionate | 1.5 |
| Vinyl silane | 1.75 |
| Butylperoxydiisopropylbenzene | 5.75 |

What is claimed is:

1. A stain resistant flame retardant insulating composition comprising the following components:

| Resin Component | Weight % (Based upon 100 parts of resin) |
| --- | --- |
| Ethylene-vinyl acetate copolymer | 30–70 |
| Polyethylene | 30–70 |

| Additives | Parts/100 parts of resin |
| --- | --- |
| Filler selected from the group consisting of aluminum trihydrate, hydrated magnesia, and hydrated calcium silicate | 80–150 |
| Tetrakis methane | 0.5–4 |
| Thiodiethylene hydrocinnamate | 0.25–3 |
| Distearothiodipropionate | 0.5–4 |
| Vinyl silane | 0.5–5 |
| Peroxide selected from the group consisting of butylperoxydiisopropylenebenzene, dicumyl peroxide, t-butylcumyl peroxide, and mixtures thereof. | 1–10 |

2. The composition of claim 1, wherein the polymer system comprises about 60 weight % ethylene-vinyl acetate and about 40 weight % polyethylene.

3. The composition of claim 1, wherein the filler is aluminum trihydrate.

4. The composition of claim 1, wherein the polyethylene is in the form of the low density homopolymer.

5. The composition of claim 1, wherein the ethylene-vinyl acetate copolymer contains about 25 to 35 weight % vinyl acetate.

6. The composition of claim 5, wherein the ethylene-vinyl acetate copolymer contains about 28 weight % vinyl acetate.

7. The composition of claim 1, characterized by stain resistance to conditions of natural aging and heat aging at voltages varying up to 2000 volts.

8. The composition of claim 1, characterized by stain resistance to exposure of gases selected from the group consisting of hydrogen sulfide and methane, at voltages varying up to 2000 volts.

9. The composition of claim 1, having a color that remains substantially white under elevated heating and combustion temperature conditions.

10. A stain resistant, flame retardant insulating composition comprising the following components in parts by weight:

| Component | Parts By Weight |
| --- | --- |
| Ethylene-vinyl acetate | 60 |
| Polyethylene | 40 |
| Hydrated alumina | 125 |
| Tetrakis methane | 1.5 |
| Thiodiethylene hydrocinnamate | 0.75 |
| Distearothiodipropionate | 1.5 |
| Vinyl silane | 1.75 |
| Butylperoxydiisopropylbenzene | 5.75 |

11. The composition of claim 10, wherein the ethylene-vinyl acetate copolymer contains about 28 weight % vinyl acetate.

12. The composition of claim 10, having a color that remains substantially white under elevated heating and combustion temperature conditions.

13. A method for making a stain resistant, flame retardant insulation composition comprising the following components:

| Resin Component | Weight % (Based upon 100 parts of resin) |
| --- | --- |
| Ethylene-vinyl acetate copolymer | 30–70 |
| Polyethylene | 30–70 |

| Additives | Parts/ 100 parts of resin |
| --- | --- |
| Filler selected from the group consisting of aluminum trihydrate, hydrated magnesia, and hydrated calcium silicate | 80–150 |
| Tetrakis methane | 0.5–4 |
| Thiodiethylene hydrocinnamate | 0.25–3 |
| Distearothiodipropionate | 0.5–4 |
| Vinyl silane | 0.5–5 |
| Peroxide selected from the group consisting of butylperoxydiisopropylenebenzene, dicumyl peroxide, t-butylcumyl peroxide, and mixtures thereof | 1–10, | wherein the filler and silane component are intimately contacted by incorporating the silane with the polymer system, followed by addition of the filler and the remaining components.

14. The method of claim 13, wherein said insulating composition is used in the form of uniinsulation at voltages varying up to about 2000 volts.

* * * * *